Figures 1, 2:
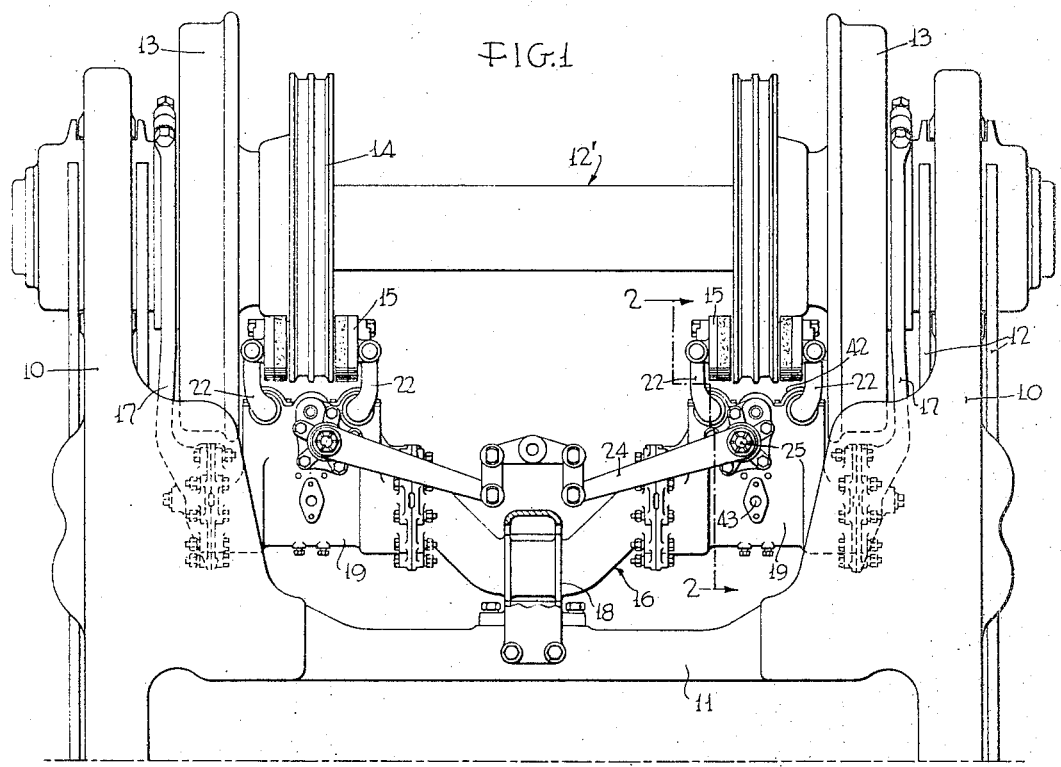

May 1, 1945.   W. H. FARR   2,374,853
BRAKE MECHANISM
Filed Oct. 2, 1943   2 Sheets-Sheet 1

INVENTOR
Warren H. Farr.
BY John P. Jacbro
ATTORNEY

Patented May 1, 1945

2,374,853

UNITED STATES PATENT OFFICE 2,374,853

BRAKE MECHANISM

Warren H. Farr, Detroit, Mich., assignor to Budd Wheel Company, Philadelphia, Pa., a corporation of Pennsylvania Application October 2, 1943, Serial No. 504,683

5 Claims. (Cl. 188—153)

The invention relates to a brake mechanism, and, more particularly, to such a mechanism in which the support for the non-rotating member or shoe of the mechanism and its actuating means includes a sealed casing housing parts of the actuating means.

The invention is especially concerned with the construction of the casing and an actuating lever, and the manner of mounting the lever on the casing, with the lever cooperating, on the one hand, with an actuating means within the casing and, on the other hand, with a brake shoe.

It is among the objects of the invention to simplify the manufacture of the casing and the actuating lever associated therewith, to facilitate their assembly one with the other and with actuating means for the lever, and to provide a construction which permits simple and efficient sealing of the casing throughout, and particularly where the lever passes through the casing, against the entrance of water or dirt.

These objects are in large part attained by mounting the lever in bearings in spaced walls of the casing, and offsetting its arms along the pivotal portion thereof, which is seated in said bearings, at least one arm extending outside the casing from the end of the adjacent pivotal portion for cooperation with a brake shoe, and another extending into the casing into cooperative but readily withdrawable relation with a brake cylinder actuator.

This arrangement of lever arms and bearings facilitates the sealing of the bearings, since they may be plain cylindrical bearings, and it further facilitates the making of the lever, since it can be made as a simple one-piece forging. For ready assembly and disassembly of the one-piece lever with the casing, the latter is divided in the plane of the bearing axes, into a main casing part and a removable cover part, and the bearings are split bearings formed, respectively, one half on each casing part.

Other and further objects and advantages and the manner in which they are attained will become apparent from the following detailed description when read in connection with the accompanying drawings forming a part of this specification.

Figure 3:
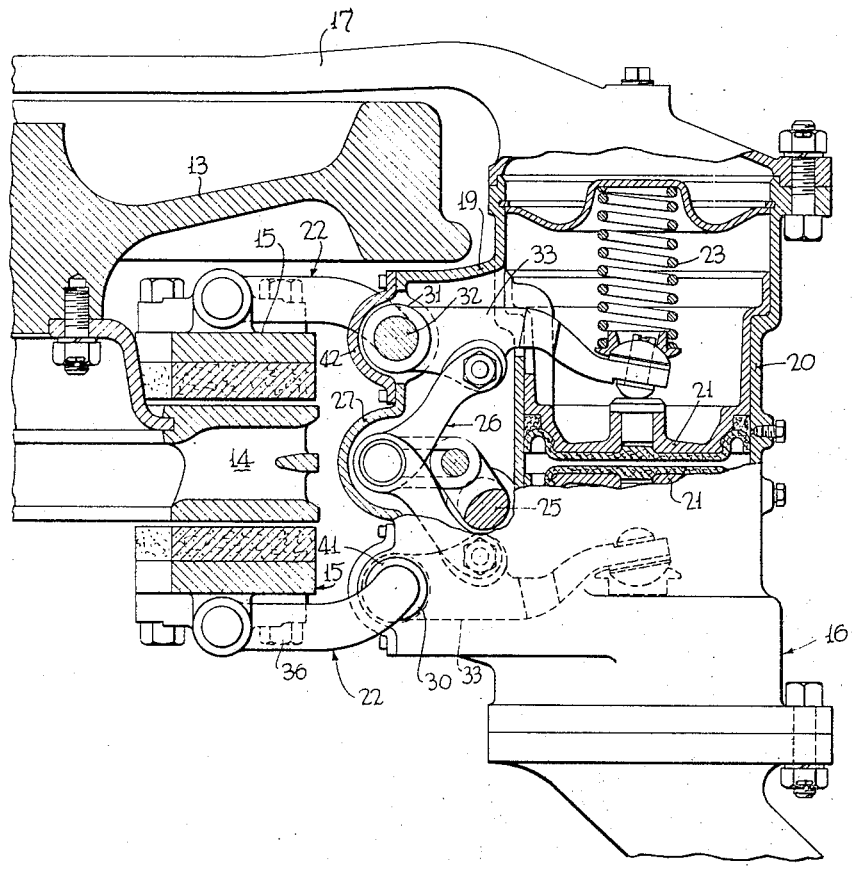

In the drawings,

Fig. 1 is a plan view of one end of a railway truck showing the brake mechanism of the invention applied thereto;

Fig. 2 is a vertical longitudinal sectional view through the casing at the location of a lever pivot, the section being taken substantially on the line 2—2 of Fig. 1, but omitting the showing of the manually operated braking mechanism; and Fig. 3 is an enlarged fragmentary view of a portion of the brake mechanism, parts being shown in horizontal section, taken substantially along the line 3—3 of Fig. 2, and parts in plan.

In the drawings, the invention is shown applied to a brake mechanism for railway trucks generally similar to that shown in application Serial No. 399,779, filed June 26, 1941, for "Brake mechanism," but it will be understood that the main features thereof are equally applicable to other types of brake mechanism and are useful in other relations.

The brake mechanism is shown applied to a truck having a frame including side frame members 10 interconnected by transoms, as 11, and supported in a usual manner through equalizer bars 12 and springs (not shown), from the wheel and axle assembly 12', the latter carrying the spaced wheels 13, which have secured to them the rotary brake rings 14. Cooperating with the brake rings 14 for effecting the braking are the segmental brake shoes 15, a pair for each ring.

The shoes and their actuating means are carried by a generally U- or C-form support, as seen in plan, designated generally by numeral 16. The brake support, as clearly appears in Fig. 1, may be built up of a number of separable parts, bolted together in their meeting faces, and is supported, as shown, by a three-point suspension, side arms 17 being supported, respectively, on the axle boxes at the opposite ends of the wheel and axle assembly 12', and its intermediate part by a cushioned mounting in a bracket 18 extending from the transom 11.

The support 16 is in large part hollow and forms a closed sealed casing portion 19 expanded in longitudinal direction adjacent each brake ring 14. This casing 19 houses a large part of the brake operating mechanism associated with the brake rings.

In said longitudinally expanded portion of the casing 19 adjacent each brake ring is housed a brake cylinder, as 20, having two opposed pistons 21 movable therein, one cooperating with each of a pair of brake levers, as 22, for operating the associated shoes 15, pivotally connected thereto. Return springs, as 23, are provided to return the respective pistons, brake levers and shoes to inoperative positions.

In addition to the cylinder actuator for the pairs of shoes, a separate manually operated means is provided comprising a lever, as 24, secured to a shaft 25, vertically pivoted in the casing 19, and connected to operate the associated brake levers 22 by a lever link mechanism 26, see Fig. 3.

All the parts so far described have their counterparts in the above-identified earlier application and may be generally similar thereto, except for the brake levers and their mounting means.

The present invention differs mainly from that disclosed in the earlier application in the form of the actuating or brake levers 22 and the manner of their mounting in the sealed casing. Since all the actuating levers 22 are similar and similarly mounted, a detailed description of one, together with its associated parts, will suffice.

The casing 19 according to this invention has the generally vertical wall 27 of its longitudinally expanded portion, arranged adjacent the associated rotary brake ring 14, completely closed, but adjacent to this vertical wall 27, the casing has formed in its spaced upper and lower walls, 28 and 19, cylindrical bearings 30 and 31, respectively, for receiving the pivotal portion, as 32, of the actuating lever 22.

Between the parts of the pivotal portion 32 directly cooperating with the spaced bearings 30 and 31, the actuating lever 22 is provided with an integral arm 33 etxending into the casing and through slots 34 and 35 in the cylinder and piston skirt, respectively, into cooperative abutting relation with the center of the associated piston 21.

Integrally secured to the outer ends of the pivotal portion 32 beyond the bearings 30 and 31 are the top and bottom arms 36 and 37, offset along the pivotal portion from the arm 33. These arms extend outside the casing generally parallel to each other and are each pivotally connected, at 38, to the back of the associated brake shoe 15. Instead of using two arms to support the shoe, one arm might be utilized, in which case its end would be connected centrally to the shoe.

With this arrangement of bearings for the lever 22, the bearings may be readily made tight by suitable annular packing means, generally indicated at 39, and held in place between the wear bushings, as 40, and collars, as 41, on the lever pivot portion 32.

In order to permit the lever including its pivotal portion 32 and the arms 33, 36 and 37 to be made as a unitary forging, the bearings 30 and 31 are preferably made as split bearings, one-half being on the main body of the casing 19 and the other on a removable cover portion 42 cooperating with both bearings, and fitting along its margins on a machined seat on the casing proper and tightly bolted thereto, as indicated clearly in Fig. 3. Such a joint can readily be sealed by a suitable sealing strip, not shown, and, of course, the other bolted joints of the casing are similarly sealed.

With this split arrangement of the casing at the bearings, when the cover portion 42 is removed, the lever 22 can be partly withdrawn from the casing, after which access is had by inserting a suitable tool or tools through the opening, to release the manually operated linkage 26 from the lever and to back off the spring 23 from the end of the arm 33 after which the lever can be wholly withdrawn from the casing, the slotted piston and cylinder and the abutting relation of the lever and piston readily permitting its withdrawal.

The operation of the brake mechanism will now be briefly described. If the brakes are to be applied, compressed air is admitted from any suitable control station through a port, as 43, in the cylinder wall into the space between the pistons 21. This forces the pistons outwardly and they actuate the levers 22 to force the brake shoes 15 carried thereby into braking engagement with the associated brake ring 14. After the release of the air pressure, the springs 23 return the parts to the inoperative position shown in Fig. 3. Similarly, operation of the manually operated lever 24, acts through the lever-link connection 26 to spread the arms 33 of the associated brake levers 22 and thus swing them about their pivots to bring the brake shoes into braking relation with the ring 14. When the manually operated lever is released, the springs 23 again return the parts to inoperative position.

While a specific embodiment of the invention has been herein described, it will be understood that changes and modifications may be made by those skilled in the art without departing from the main features of the invention, and such changes and modifications are intended to be included in the scope of the appended claims.

What is claimed is:

1. In a brake mechanism, a brake support including a closed casing having an actuating cylinder therein, a brake-actuating lever pivoted in spaced walls of said casing through spaced parts of a pivot portion thereof engaging bearings in said spaced walls of the casing, said lever having arms offset along the axis of the pivot portion extending from said pivot portion, one outside the casing for cooperation with a brake shoe and another inside the casing into cooperative relation with said actuating cylinder.

2. In a brake mechanism, a brake support for a non-rotary brake member including a closed casing divided along a plane adjacent one wall thereof into two separable parts, each part carrying opposed portions of split bearings formed in the spaced walls of the casing, a brake-actuating lever having a pivot portion cooperating with said bearings, an arm extending from the pivot portion between the bearings into said casing, and another arm extending in offset relation lengthwise of the axis of said pivot portion to said first-named arm from the pivot portion outside said casing for cooperation with said non-rotary member.

3. In a brake mechanism, a brake support including a closed casing housing a brake cylinder actuator adjacent one wall thereof, a brake-actuating lever pivoted in said casing adjacent an opposite wall of the casing, said lever comprising spaced pivot portions engaging bearings in spaced walls of the casing, a single arm extending from said pivot portion within the casing into cooperative relation with the brake cylinder actuator, and a pair of arms axially offset from said first-named arm lengthwise of the axis of said pivot portion and extending from the respective ends of said pivot portion externally of the casing each for cooperation with a brake shoe.

4. A brake support comprising a closed casing, an actuating cylinder and piston therein, a brake-actuating lever mounted in the casing intermediate its ends and having one arm projecting in position for actuation by said cylinder, and another arm outside the casing for actuating engagement with a brake shoe, said second arm being offset from said first arm, and the lever being supported from the casing by a sealed bearing including a pivot portion interconnecting said offset arms.

5. A brake mechanism comprising a closed casing supporting a brake shoe and an actuating lever therefor, the actuating lever being pivoted on the casing intermediate its ends through a pivot portion and having arms integral with and offset along the axis of said portion, one outside the casing for engagement with a brake shoe and the other inside the casing for engagement with actuating means.

WARREN H. FARR.